H. E. NICKERSON.

Lathes.

No. 5,817. Reissued March 31, 1874.

WITNESSES.

Chas. F. Steele

G. E. Upham

INVENTOR.

H. E. Nickerson,

Chapman & Foamer & Co

Attys.

AM. PHOTO-LITHOGRAPHIC Co. N. Y. (OSBORNE'S PROCESS.)

UNITED STATES PATENT OFFICE.

HEZEKIAH E. NICKERSON, OF ATCHISON, KANSAS.

IMPROVEMENT IN LATHES.

Specification forming part of Letters Patent No. 133,593, dated December 3, 1872; reissue No. 5,817, dated March 31, 1874; application filed April 19, 1873.

*To all whom it may concern:*

Be it known that I, HEZEKIAH E. NICKERSON, of Atchison, in the county of Atchison and State of Kansas, have invented a new and Improved Lathe; and I do hereby declare that the following is a full, clear, and exact description of the construction and operation of the same, reference being had to the annexed drawings, making a part of this specification, and to the letters and figures of reference marked thereon.

Figure 1:
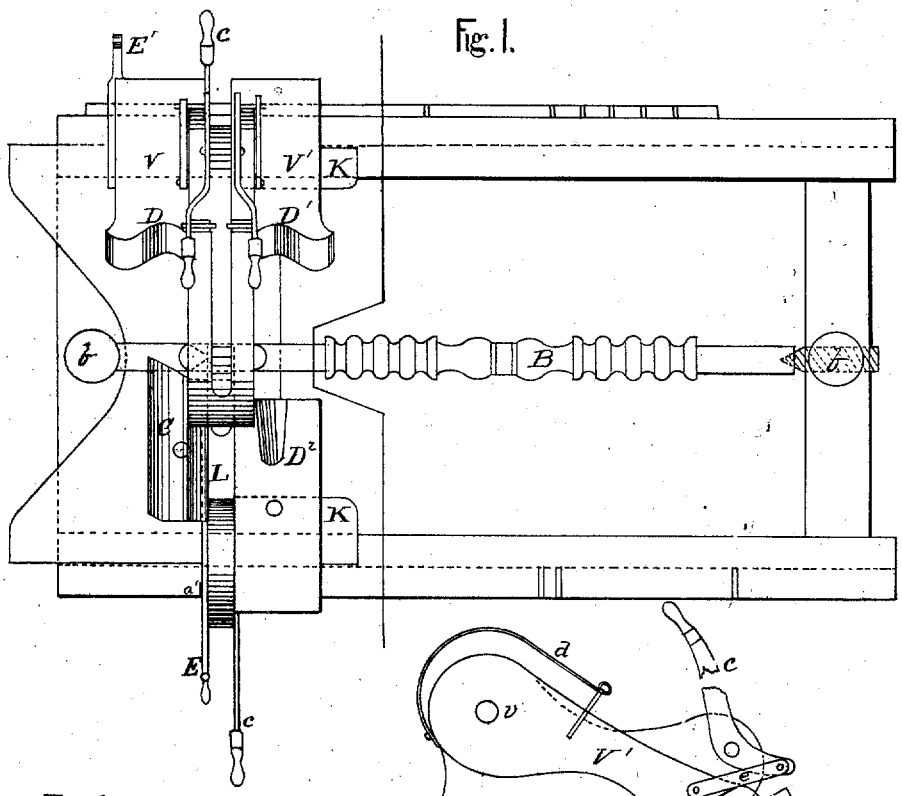
Figure 2:
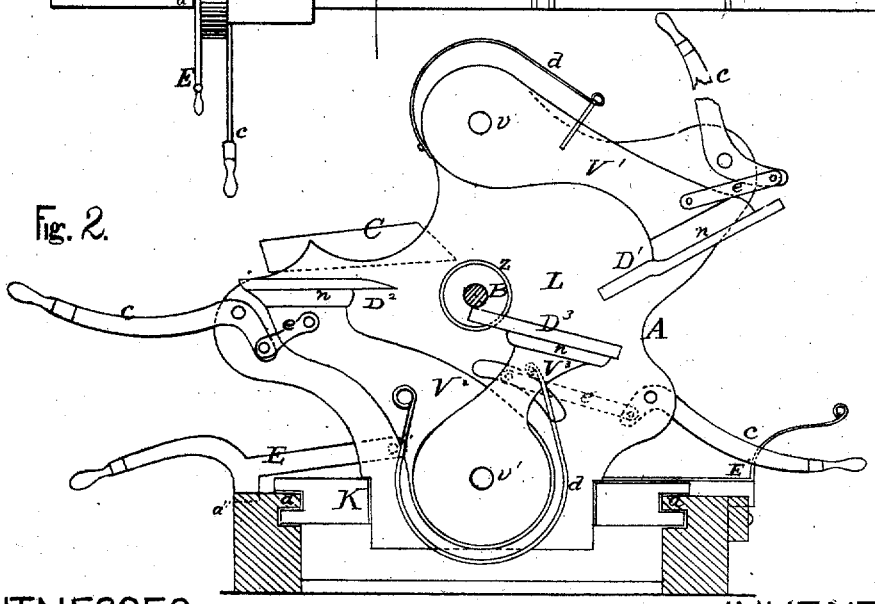

Figure 1 of the drawings is a top view of my molding-lathe. Fig. 2 is a vertical transverse section of the same.

My invention relates to wood-turning lathes; and consists in the construction and novel arrangement of the levers, knives, and springs of the traveling carriage, whereby the operation of turning balusters, bedstead-posts, and other analogous articles is facilitated.

In the accompanying drawings, the letter A represents a carriage sliding on two rails, *a a*, which constitute the top of the lathe-frame. This carriage consists of a base, K, and a vertical body-plate, L, to which the arms carrying the cutters are pivoted. *b b* indicate the head and tail stocks, as commonly constructed in an ordinary turning-lathe. The wood B to be turned is held between the two stocks, in the ordinary manner, and passes through a hole, *z*, in the carriage. To the carriage is secured, in a rigid manner, a knife, C, for cutting the wood down to the requisite diameter. D $D^1$ $D^2$ $D^3$ are knives or cutters, attached to the bearing-arms V $V^1$ $V^2$ $V^3$ at angles somewhat acute, and so related to the pivoted centers of said arms that the planes of the cutters will be tangent to the different circles of the work, and at right angles with lines intersecting the pivoted centers *v v'*, and normal thereto, at or near their cutting-edges. These cutter-arms are pivoted above and below the work, and are arranged, on each side of the vertical body L, in such a manner that a single pivot will serve for two knives. These cutter-arms are provided with operating-levers *c*, pivoted to the body L and connecting-links *e*. Springs *d* are also provided for retracting the knives from the work.

It is convenient, when several knives are attached on the same pivot, and same side of the body L, to attach the ends of one retracting-spring to said knives, thus operating them both, as indicated in the case of the knives $D^2$ and $D^3$ on the drawings.

There may be but one pivoted knife on the carriage, or any number, according to the varieties of moldings to be turned on the wood, the cutting-edges of the several knives being shaped in accordance with the moldings to be cut.

To the carriage A is also pivoted a catch, E, to lock it in notches which are cut into two of the rails *a;* or there may be two catches, E and E', one on each side of the carriage, and both rails *a* may be notched, or else the notches may be formed in strips fastened to said rails.

As the carriage is fed along the rails, it is locked by the catch or catches in the successive notches; and, whenever it is so locked, one of the pivoted knives is swung against the wood, to impart to it the desired shape at that place. In this manner the wood can be quickly shaped with precision, and—on account of the arrangement of the cutters tangent to the work, and, at the same time, to circles described from their pivoted centers—without danger of jagging into the work, or cutting it off at the center.

The arrangement of the operating-levers and connecting-links enables the levers of knives on the opposite side of the work to be brought to the front, thereby saving steps and time in the manipulations of the operator.

What I claim is—

1. The combination, with a lathe-carriage having the work-opening *z*, of the cutters D $D^1$ the cutters $D^2$ $D^3$, the retracting-springs *d*, the operating-levers *c*, and the links *e*, connecting said levers to said cutters, substantially as specified.

2. The knives $D^2$ $D^3$, pivoted to the carriage A at the same point, connected by the single spring *d*, and provided with levers and connecting-links, substantially as specified.

3. The combination, with the lathe-frame and knife-carriage, of the roughing-knife C and pivoted molding-knife D, substantially as specified.

In testimony that I claim the above I have hereunto subscribed my name in the presence of two witnesses.

HEZEKIAH E. NICKERSON.

Witnesses:
G. D. HARRISON,
JOHN V. JILLICH.